UNITED STATES PATENT OFFICE.

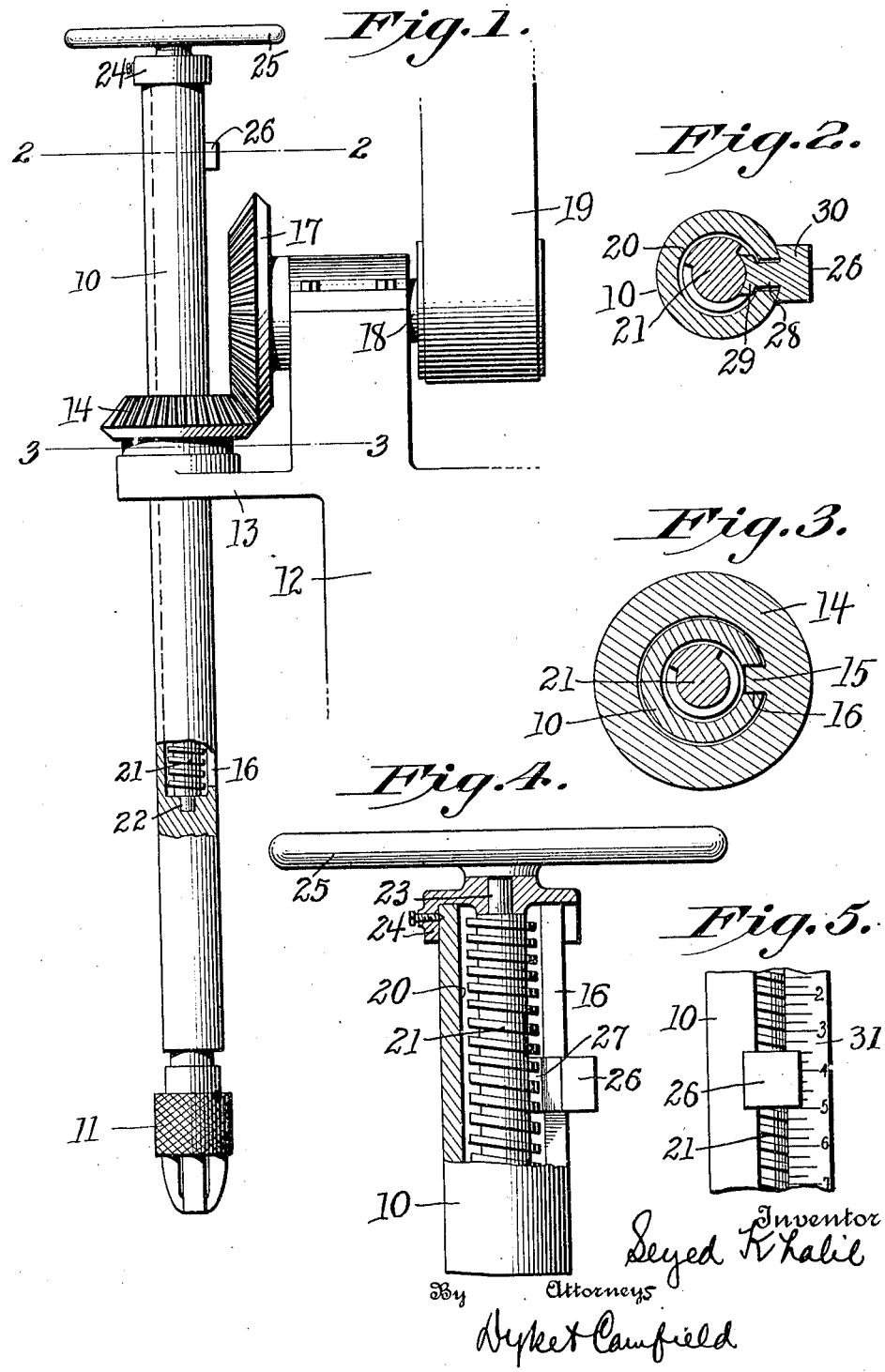

SEYED KHALIL, OF NEWARK, NEW JERSEY, ASSIGNOR OF ONE-FOURTH TO ALBERT STEINBRUNNER, OF ROSEVILLE, NEW JERSEY.

DRILLING-MACHINE.

1,291,922.   Specification of Letters Patent.   Patented Jan. 21, 1919.

Application filed June 28, 1918. Serial No. 242,468.

*To all whom it may concern:*

Be it known that I, SEYED KHALIL, a subject of the Shah of Persia, and a resident of Newark, county of Essex, and State of New Jersey, have invented certain new and useful Improvements in Drilling-Machines, of which the following is a specification.

The object of the present invention is the provision of novel stop means for terminating the movement of a drill spindle at a desired point or points, and with this object in view, the invention consists in the combinations of elements hereinafter described and pointed out in my claims.

In the accompanying drawing there is shown, for the purpose of affording a clear understanding of my invention only, and not for the purpose of limitation, one form of structure in which the invention may be embodied.

In said drawing, Figure 1 is a front view of a sufficient portion of a drilling machine to enable an understanding of the application of my invention thereto. Figs. 2 and 3 are, respectively, cross-sectional views on the lines 2—2 and 3—3, Fig. 1, and Figs. 4 and 5 are detail views.

10 designates a drill spindle which may be of any construction and may be moved up and down in any desired manner. 11 designates a chuck on the spindle 10 for holding drills, reamers and the like tools. 12 designates a portion of the machine frame, in the portion 13 whereof the spindle 10 is mounted for rotation and longitudinal movement. Any means for moving the spindle up and down may be resorted to and the same have not been considered necessary to illustrate herein. Various means for rotating the spindle 10 may be used. As here shown it is rotated by a bevel gear 14 having a spline member 15 adapted to be received and to slide in a spline-way 16 in the spindle 10, and the bevel gear 14 is driven from a bevel gear 17, to the shaft 18 of which power is applied by means of a pulley 19. All the foregoing parts may be of any ordinary or usual construction, my invention residing in the means for limiting longitudinal movement of the spindle 10, as will now be described.

In the embodiment of my invention illustrated, the drill spindle 10 is bored out, as at 20, and a screw or worm 21 is mounted to rotate in the bore 20, as, for example, it may have a pivot bearing 22 at its lower end, and the bearing 23 may turn in the collar 24 at its upper end. The projecting upper end of the screw or worm 21 is provided with operating means, as, for example, a hand wheel 25.

A stop piece 26 having teeth 27 to engage the teeth of the worm or screw 21 is mounted to slide in a spline-way in the spindle 10. In the form shown the same spline-way 16 is utilized for this purpose and also receives the spline member 15 of the drive gear 14, said spline-way 16 receiving both the reduced portion 28 of the stop piece 26 and the spline member 15. The stop piece 26 is preferably enlarged somewhat on each side of the reduced portion 28, as shown at 29 and 30, to maintain the same in proper position relative to the walls of the spindle 10, the teeth 27 of the stop piece being in the portion 29 extending within the bore 20.

The spindle is preferably provided with indicating means such as a scale 31 marked or secured thereon, and such scale may be of any character so long as it enables identification of the position of the stop piece 26 to be made.

In making use of the apparatus of the present invention the stop piece 26 is placed at any desired point, which may be determined by reference to the scale 31, by turning the screw or worm 21 in engagement therewith by means of the hand wheel 25. The teeth of the member 21 and the teeth 27 of the stop piece 26 being preferably of such character that the movement of these parts is irreversible, the stop piece remains in the position where it is placed by rotating the hand wheel 25 until purposely moved therefrom by means of rotating the hand wheel 25. The stop piece, having been so located, serves to limit the downward movement of the spindle 10 at the desired point. This may be accomplished by engagement with any suitable surface, but in the form shown it is accomplished by engagement of the stop piece 26 with the upper surface of the drive gear 14. When the apparatus is set in this manner any desired operation may be carried out rapidly and as many times as wanted, as, for example, a number of holes may be drilled to a predetermined depth, or may be reamed, so as to secure the enlargement of previously formed holes to a certain predetermined depth, or various other operations may be carried out, as will be understood, and when it is desired to set the apparatus for other work it is only necessary to relocate the stop piece 26 at any desired point, as by means of the hand wheel 25.

It will be understood that my invention is not limited to the construction shown, but that various changes and modifications may be resorted to, within the scope of my claims, without departing from the spirit of my invention or sacrificing its advantages.

I claim:

1. In a drilling machine, a hollow spindle mounted to be rotated and to move longitudinally, adjustable stop means on said spindle for limiting the longitudinal movement thereof and having a portion thereof extending into the hollow spindle, and a screw within said hollow spindle for engaging with and moving said stop means to adjusted positions.

2. In a drilling machine, a drill spindle provided with a bore, stop means on said spindle for limiting its longitudinal movement, and means within said bore for moving said stop means.

3. In a drilling machine, a drill spindle having a longitudinal bore therein, a screw or worm in said bore, a spline-way in said spindle and communicating with said bore, and an adjustable stop piece mounted for sliding movement in said spline and having means thereon for engagement with said worm or screw.

4. In a drilling machine, a drill spindle mounted to be rotated and moved longitudinally, said spindle having a spline-way therein, means for rotating said spindle adapted to be received in said spline-way, a stop piece on said spindle and being mounted to slide within said spline-way, and means for moving said stop piece up and down to predetermined positions upon said spindle.

5. In a drilling machine, a spindle having a bore therein and a spline-way extending from said bore to the exterior of said spindle, means for rotating said spindle having sliding engagement therewith by means of said spline-way, stop means on said spindle mounted to slide in said spline-way, and a screw within said bore for engaging with and moving said stop piece.

6. In a drilling machine, a spindle having a spline-way therein, means for rotating said spindle, and stop means for limiting the longitudinal movement of said spindle, both of said means being adapted for engagement with said spline-way.

7. In a drilling machine, a drill spindle provided with a longitudinal bore, a screw or worm mounted to rotate in bearings in said bore and having a hand wheel thereon by means whereof it may be rotated, a spline-way leading from said bore to the exterior of said spindle, a stop having a reduced portion adapted to slide in said spline-way and having teeth on its interior portion adapted to engage the teeth of said screw or worm, means for imparting rotation to said spindle and adapted to be slidably connected therewith by means of said spline-way, and a scale on said spindle for determining the location of said stop piece.

In testimony that I claim the foregoing, I hereto set my hand, this 24th day of June, 1918.

SEYED KHALIL.